United States Patent
Asami

(10) Patent No.: US 10,080,955 B2
(45) Date of Patent: Sep. 25, 2018

(54) DATA PROCESSING APPARATUS AND METHOD OF CONTROLLING DISPLAY

(71) Applicant: KOEI TECMO GAMES CO., LTD., Kanagawa (JP)

(72) Inventor: Kenichi Asami, Kanagawa (JP)

(73) Assignee: KOEI TECMO GAMES CO., LTD., Kanagawa (JP)

(*) Notice: Subject to any disclaimer, the term of this patent is extended or adjusted under 35 U.S.C. 154(b) by 34 days.

(21) Appl. No.: 15/259,258

(22) Filed: Sep. 8, 2016

(65) Prior Publication Data

US 2017/0075417 A1    Mar. 16, 2017

(30) Foreign Application Priority Data

Sep. 11, 2015   (JP) .................................. 2015-180112

(51) Int. Cl.
| | |
|---|---|
| A63F 13/212 | (2014.01) |
| A63F 13/25 | (2014.01) |
| A63F 13/32 | (2014.01) |
| A63F 13/335 | (2014.01) |
| G06F 3/01 | (2006.01) |

(52) U.S. Cl.
CPC ............ *A63F 13/212* (2014.09); *A63F 13/25* (2014.09); *A63F 13/32* (2014.09); *A63F 13/335* (2014.09); *G06F 3/011* (2013.01); *A63F 2300/308* (2013.01); *A63F 2300/8082* (2013.01)

(58) Field of Classification Search
CPC .......... G06F 3/013; A63F 13/25; A63F 13/32; A63F 13/335; A63F 13/212; A63F 2300/308; A63F 2300/8082
See application file for complete search history.

(56) References Cited

U.S. PATENT DOCUMENTS

| | | | | |
|---|---|---|---|---|
| 6,603,516 | B1* | 8/2003 | Fujiwara | G09G 5/00 348/558 |
| 2006/0007135 | A1* | 1/2006 | Imagawa | G06F 1/3203 345/156 |
| 2009/0184981 | A1* | 7/2009 | de Matos | H04N 5/44543 345/676 |
| 2012/0050280 | A1* | 3/2012 | Kim | H04N 13/0438 345/419 |
| 2013/0278497 | A1* | 10/2013 | Takagi | G06F 3/012 345/156 |

FOREIGN PATENT DOCUMENTS

JP         2003-279882        10/2003

* cited by examiner

*Primary Examiner* — Shaheda Abdin
(74) *Attorney, Agent, or Firm* — IPUSA, PLLC

(57) ABSTRACT

A data processing apparatus that controls a screen displayed by a body-mounted data display device, includes a judging unit that judges whether to control an amount of change of an image displayed in the screen by comparing data obtained from the data display device and a previously set display control pattern; a display control unit that controls the amount of change of the image displayed in the screen in accordance with a judged result obtained by the judging unit; and a content generation unit that generates a content to be displayed in the screen based on a content set by the display control unit, and outputs the generated content to the data display device.

7 Claims, 6 Drawing Sheets

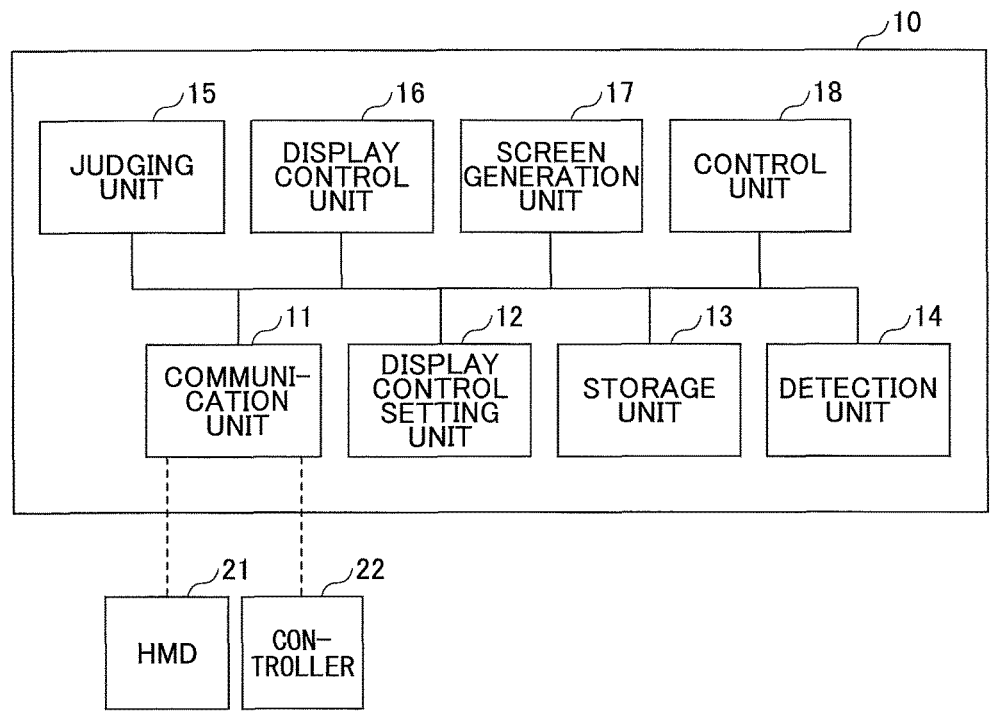
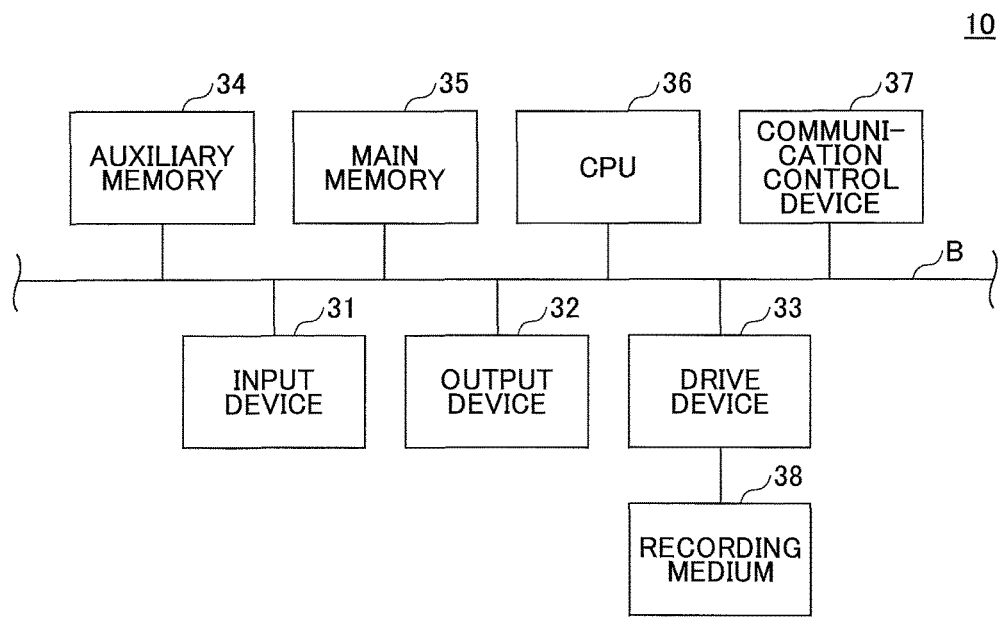

FIG.7

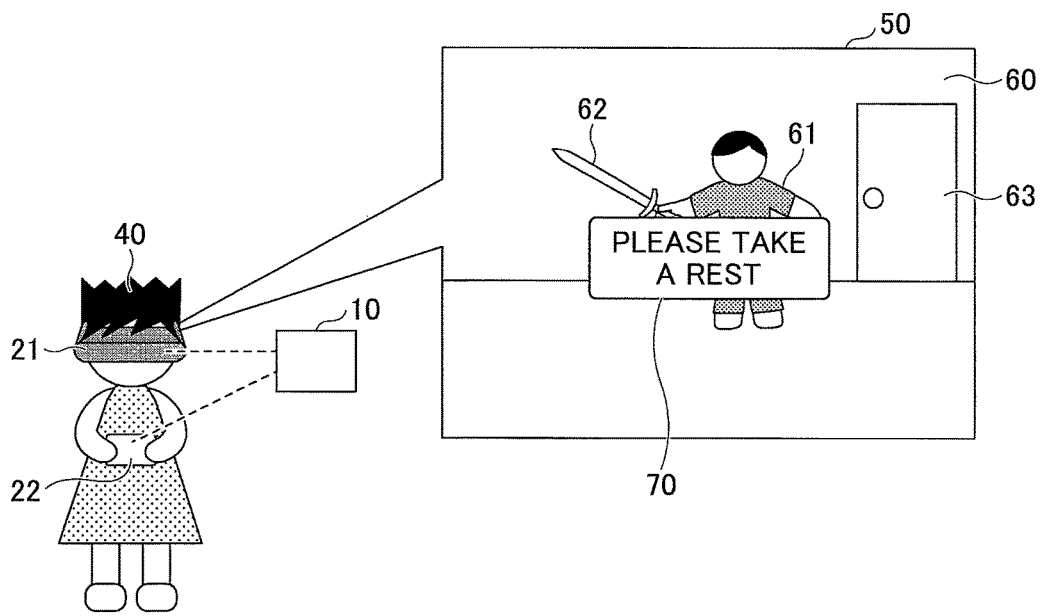

FIG.8

| CONDITION | RANGE | CONTENT OF CONTROL | ... |
|---|---|---|---|
| VELOCITY OF VIEWPOINT, FIXATION POINT | GREATER THAN OR EQUAL TO A (m / s) | SCENE CUT, VIBRATION OF UPPER AND LOWER PORTIONS IS CUT | ... |
| AMOUNT OF CHANGE OF POSITION OF VIEWPOINT, FIXATION POINT | GREATER THAN OR EQUAL TO B (m) | DISPLAY WARNING MESSAGE | ... |
| AMOUNT OF CHANGE OF HEAD POSITION | GREATER THAN OR EQUAL TO C (m) | SCENE CUT, VIBRATION OF UPPER AND LOWER PORTIONS IS CUT | ... |
| ⋮ | ⋮ | ⋮ | ⋮ |

DATA PROCESSING APPARATUS AND METHOD OF CONTROLLING DISPLAY

CROSS-REFERENCE TO RELATED APPLICATION

The present application is based on and claims the benefit of priority of Japanese Priority Application No. 2015-180112 filed on Sep. 11, 2015, the entire contents of which are hereby incorporated by reference.

BACKGROUND OF THE INVENTION

1. Field of the Invention

The present invention relates to a data processing apparatus and a method of controlling display.

2. Description of the Related Art

Conventionally, a body-mounted data display device (a wearable data display device) such as a Head Mounted Display (HMD), Face Mounted Display (FMD) or the like has been provided. By wearing such a data display device, an image can be displayed in the entirety of the eyesight of a user, or the user can feel as if he/she is in a virtual space by a Virtual Reality (VR) technique.

Further, recently, a technique has been developed in which such a data display device is equipped in a game device or the like to give a feeling to a player that the player joins a game in a virtual space, and to improve immersion in the game or entertainment of the game.

However, when realistically actualizing the virtual space, a vibration, an oscillation or the like on a screen may occur. As a user does not actually move, there is a risk that the user suffers from so-called "visually induced motion sickness" when such a vibration or the like occurs. Thus, a method of preventing such sickness due to a HMD or the like is provided (see Patent Document 1, for example).

However, although the visually induced motion sickness differs for each user, and differs for the status of the user at the moment, according to the conventional technique, it is impossible to appropriately prevent the visually induced motion sickness in accordance with each case.

PATENT DOCUMENT

[Patent Document 1] Japanese Laid-open Patent Publication No. 2003-279882

SUMMARY OF THE INVENTION

The present invention is made in light of the above problems, and provides a technique to appropriately prevent visually induced motion sickness.

According to an embodiment, there is provided a data processing apparatus that controls a screen displayed by a body-mounted data display device, includes a judging unit that judges whether to control an amount of change of an image displayed in the screen by comparing data obtained from the data display device and a previously set display control pattern; a display control unit that controls the amount of change of the image displayed in the screen in accordance with a judged result obtained by the judging unit; and a content generation unit that generates a content to be displayed in the screen based on a content set by the display control unit, and outputs the generated content to the data display device.

BRIEF DESCRIPTION OF THE DRAWINGS

Other objects, features and advantages of the present invention will become more apparent from the following detailed description when read in conjunction with the accompanying drawings.

FIG. 1 is a block diagram illustrating an example of a functional structure of a data processing apparatus of an embodiment;

FIG. 2 is a block diagram illustrating an example of a hardware structure of the data processing apparatus of the embodiment;

FIG. 7 is a view illustrating an example of displaying a message; and

FIG. 8 is a view illustrating an example of a display control pattern.

DETAILED DESCRIPTION OF THE PREFERRED EMBODIMENTS

Figure 3:
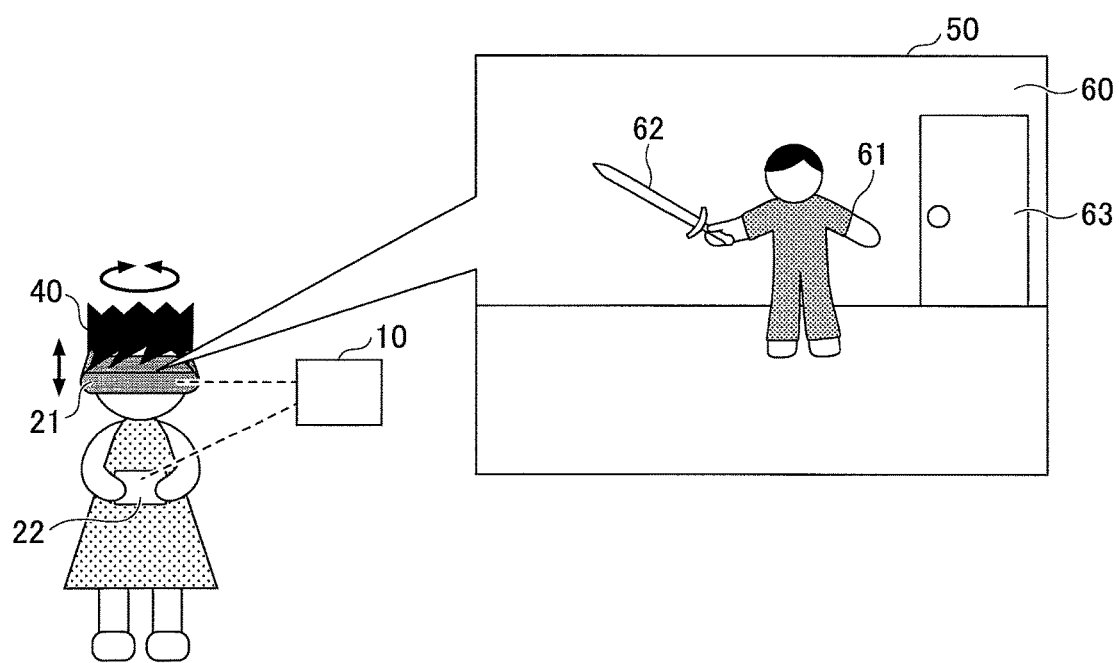
FIG. 3 is a view schematically illustrating an example of display control of the embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Example of Functional Structure of Data Processing Apparatus)

FIG. 1 is a block diagram illustrating an example of a functional structure of a data processing apparatus 10 of the first embodiment. The data processing apparatus 10 illustrated in FIG. 1 includes a communication unit 11, a display control setting unit 12, a storage unit 13, a detection unit 14, a judging unit 15, a display control unit 16, a screen generation unit 17 and a control unit 18. The data processing apparatus 10 is an electronic device such as a game device, a PC (Personal Computer), a tablet terminal or the like, but not limited so.

The communication unit 11 is connected to an external device by a wired or wireless network, and sends and receives data. As illustrated in FIG. 1, a HMD (Head Mounted Display) 21, which is an example of a data display device (data display unit), and a controller 22, which is an example of an operation device (operation unit), are connected to the communication unit 11.

The HMD 21 is a display device (a body-mounted data display device) having a shape wearable at a head of a user such as glasses, goggles, a helmet, for example. When the user wears the HMD 21 at his/her head, screens are set in front of eyes of the user, respectively. The HMD 21 may display images that are slightly different from each other at bilateral displays, not just displaying an image, so that the user can view a third-dimensional image. Further, the HMD 21 may vary the screens in accordance with the movement of the head of the user so that eyesight in the virtual space can be provided.

Further, the HMD 21 may detect information regarding position of the head, direction of the head and acceleration (including velocity) of the head every time unit, and send the information to the data processing apparatus 10. Further, the HMD 21 may detect a viewpoint (a fixation point) from the position and the direction of the eyes (irises) of the user every time unit, and send the information to the data processing apparatus 10.

Further, the HMD 21 may include a sensor that detects sweat rate of the user, a body temperature sensor that detects body temperature of the user, or a heart rate detection sensor that detects heart rate of the user, and send at least one of the information obtained from these sensors to the data processing apparatus 10.

The controller 22 sets an image to be displayed on the HMD 21, and performs various settings for a display control process of the embodiment. When the data processing apparatus 10 is a game device, the controller 22 controls start and end of the game, selection of items, motion of the game and the like.

The communication unit 11 is connected to an external device via a communication network such as the INTERNET, LAN (Local Area Network) or the like so that data can be sent and received, for example. The communication unit 11 is capable of downloading a game program from the external device, or receiving and sending various data regarding a display control program of the embodiment.

The display control setting unit 12 sets a content that is displayed on the HMD 21. For example, the display control setting unit 12 sets whether to perform the display control process for preventing visually induced motion sickness, sets a display control pattern that includes a condition and the kind of the display control process performed for the condition or the like. However, the setting contents are not limited so.

The display control setting unit 12 may set the content before the game is started, or while the game is played, for example. For example, the display control setting unit 12 may cause the user to set the display control setting using a config screen before starting the game. Alternatively, the setting may be dynamically changed while playing the game by pressing a button. Further, when the user is suffering from heavy sickness, a predetermined message (a warning message or the like, for example) indicating that the user is suffering from the sickness may be displayed to suggest the user to take a rest. The message is not limited to characters, and may be a drawing pattern or the like, or may be a combination of characters and a drawing pattern.

The storage unit 13 stores various data that are necessary for the display control process of the embodiment. For example, the storage unit 13 stores the display control data set by the display control setting unit 12, the position data, the direction data and the acceleration data obtained from the HMD 21, contents of various games performed by the user and the like. However, the contents stored in the storage unit 13 are not limited so.

The detection unit 14 detects the motion of the head detected by the HMD 21 or the motion of the image data. For example, the detection unit 14 detects the motion of the image or a camera of the head. However, the content s detected by the detection unit 14 are not limited so.

The judging unit 15 judges the status of visually induced motion sickness by comparing the detected result by the detection unit 14 with a previously set judgement standard for judging "there is some possibility of causing visually induced motion sickness" or "visually induced motion sickness is occurring". For example, when there is a motion greater than or equal to a predetermined amount within a predetermined period, the judging unit 15 judges "there is some possibility of causing visually induced motion sickness" or "visually induced motion sickness is occurring". However, the contents of the judgement are not limited so.

When the judging unit 15 judges "there is some possibility of causing visually induced motion sickness" or "visually induced motion sickness is occurring", the judging unit 15 compares with the display control pattern stored in the storage unit 13 and determines whether to control the amount of change of the image displayed in the screen.

The display control unit 16 performs display control on a normal image to be displayed in the HMD 21 in accordance with the above described display control pattern based on the judged result by the judging unit 15. For example, when the amount of change of the HMD 21 or the image exceeds a predetermined amount, the display control unit 16 controls the image thereafter. The content of controlling may include reducing or terminating the amount of change of the image, for example. However, the contents are not limited so, and the number of image frames per time unit may be reduced, or another image (an image that can remedy the visually induced motion sickness, for example) may be displayed.

The screen generation unit 17 serves as a content generation unit to generate a content to be displayed on the HMD 21, for example. For example, the screen generation unit 17 generates a screen in which the content of the game to be performed by the user is displayed. The screen generation unit 17 generates an image in which the amount of change of the motion is reduced or the like by the control by the display control unit 16. The generated contents of the screen are sent to the HMD 21 via the communication unit 11 and displayed in the screen of the HMD 21.

The control unit 18 controls the entire components of the data processing apparatus 10. The control unit 18 controls sending and receiving data between various devices by the communication unit 11, setting of the display control by the display control setting unit 12, detection by the detection unit 14, judgement of the visually induced motion sickness by the judging unit 15, display control by the display control unit 16, generation of screens by the screen generation unit 17, and the like, for example. However, the contents to control are not limited so.

For example, the control unit 18 controls the start and end of performing a game process, a process when an error occurs or the like. Further, the control unit 18 may perform a process of log-in authentication for each of the users, and may perform the game, the display control process or the like for the user when the authentication succeeds.

Although the HMD 21 and the data processing apparatus 10 are separately configured in the above described embodiment, this is not limited so and the HMD 21 and the data processing apparatus 10 may be integrally configured in this embodiment. In such a case, the HMD 21 corresponds to the data processing apparatus 10. Further, the controller 22 may not be provided in this embodiment.

(Example of Hardware Structure of Data Processing Apparatus 10)

Next, an example of a hardware structure of the data processing apparatus 10 is described with reference to FIG. 2. FIG. 2 is a block diagram illustrating an example of a hardware structure of the data processing apparatus. For the example illustrated in FIG. 2, the data processing apparatus (computer) 10 includes an input device 31, an output device 32, a drive device 33, an auxiliary memory 34, a main memory 35, a CPU (Central Processing Unit) 36 and a communication control device 37, and these are connected with each other by a system bus B.

The input device 31 includes a pointing device operated by the user or the like such as a keyboard, a mouse or the like, and a sound input device such as a microphone or the like. The input device 31 accepts inputs such as an instruction to execute the program, various operation data, data for activating software or the like, from the user or the like. The input device 31 may be an operation device such as the above described controller 22 or the like.

The output device 32 includes a display or the like for displaying various windows, data or the like that are necessary for operating the computer (data processing apparatus 10) in order to perform the processes of the embodiment. The output device 32 is capable of displaying an executed process, result or the like of a program by the control program included in the CPU 36. The output device 32 may be a data display device such as the above described HMD 21 or the like.

In this embodiment, the execution program installed in the computer is provided by a recording medium 38 or the like, for example. The recording medium 38 is capable of being set in the drive device 33. The execution program stored in the recording medium 38 is installed in the auxiliary memory 34 via the drive device 33 from the recording medium 38 based on a control signal from the CPU 36.

The auxiliary memory 34 is a storage unit or the like such as a HDD (Hard Disk Drive), a SSD (Solid State Drive) or the like, for example. The auxiliary memory 34 stores the execution program (display control program) of the embodiment, the control program provided in the computer or the like. The auxiliary memory 34 inputs and outputs the programs when necessary, based on a control signal from the CPU 36. The auxiliary memory 34 is capable of reading out necessary data from various information stored therein and writing data based on a control signal from the CPU 36 or the like.

The main memory 35 stores the execution program or the like read out from the auxiliary memory 34 by the CPU 36. The main memory 35 is a ROM (Read Only Memory), a RAM (Random Access Memory) or the like.

The CPU 36 actualizes each of the processes by controlling the processes of the entirety of the computer such as various calculations, input and output of data between each of the hardware structure units or the like, based on the control program such as OS (Operating System) or the like, and the execution program stored in the main memory 35. The various data or the like necessary for executing the programs may be obtained from the auxiliary memory 34 and the executed result or the like may be stored in the auxiliary memory 34.

Specifically, the CPU 36 executes processes corresponding to the program on the main memory 35 by executing the program installed in the auxiliary memory 34 based on an execution instruction or the like of the program obtained from the input device 31, for example. For example, the CPU 36 executes the processes such as sending and receiving data between various devices by the communication unit 11, setting of the display control by the display control setting unit 12, detection by the detection unit 14, judgement of the visually induced motion sickness by the judging unit 15, display control by the display control unit 16, generation of screens by the screen generation unit 17, and the like, by executing the display control program. However the contents of the process by the CPU 36 are not limited so. The contents executed by the CPU 36 are stored in the auxiliary memory 34 or the like when necessary.

The communication control device 37 communicates with other external devices via the above described communication network. The communication control device 37 obtains an execution program, software, setting data and the like from the external device or the like by connecting to the communication network and the like, based on a control signal from the CPU 36. Further, the communication control device 37 may provide an executed result obtained by executing the program to the external device or the like, or provide the execution program of the embodiment itself to the external device or the like.

The recording medium 38 is a computer readable recording medium in which the execution program or the like is stored, as described above. The recording medium 38 is a semiconductor memory such as a flash memory or the like, a portable recording medium such as a CD-ROM, a DVD or the like, but not limited so.

By installing the execution program (a display control program or the like, for example) in the hardware structure illustrated in FIG. 2, various game processes, the display control process or the like can be actualized by the cooperation of the hardware resource and software. Further, by executing the game program installed in the recording medium 38, it is possible to display a game screen on the HMD 21, and the game can be performed by an operation by the user.

(Example of Display Control of Embodiment)

Next, display control of the embodiment is described with reference to the drawings. FIG. 3 is a view schematically illustrating an example of the display control of the embodiment. In the example of FIG. 3, a user 40 wears the HMD 21 at a head, and holds the controller 22. The HMD 21 and the controller 22 are connected to the data processing apparatus 10, and are capable of sending and receiving data.

Further, in the example of FIG. 3, there exists a virtual space 60, which is produced by a game, on a screen 50 of the HMD 21, and an enemy character (an example of object) 61, a weapon (an example of object) 62 possessed by the character 61 and a door (an example of the object) 63 are displayed in the screen 50. Here, as illustrated by an arrow in FIG. 3, when the user 40 laterally or vertically rotates her head, the HMD 21 detects its position, its direction and its acceleration, and sends the data to the data processing apparatus 10. The data may be repeatedly sent at predetermined timing. When the character moves by the operation of the user 40 using the controller 22 in the game such as when the image displayed in the screen 50 is a battle scene of a battle against the character 61, running toward the door 63 or the like, vibration or oscillation occurs in the image in the screen.

This means that the visually induced motion sickness occurs due to the motion of the image (vibration or oscillation) or the like in addition to due to the motion of the head of the user 40. Thus, in this embodiment, in order to prevent the occurrence of the above described visually induced motion sickness, the amount of change of the HMD 21 or the image is detected. Then, when the amount exceeds a predetermined amount, display control is performed to reduce or terminate the amount of change of the image thereafter for a predetermined range (predetermined period, or until the sickness is reduced, for example).

Next, examples of the display control process of the embodiment are described.

(First Example of Display Control Process)

Figure 4:
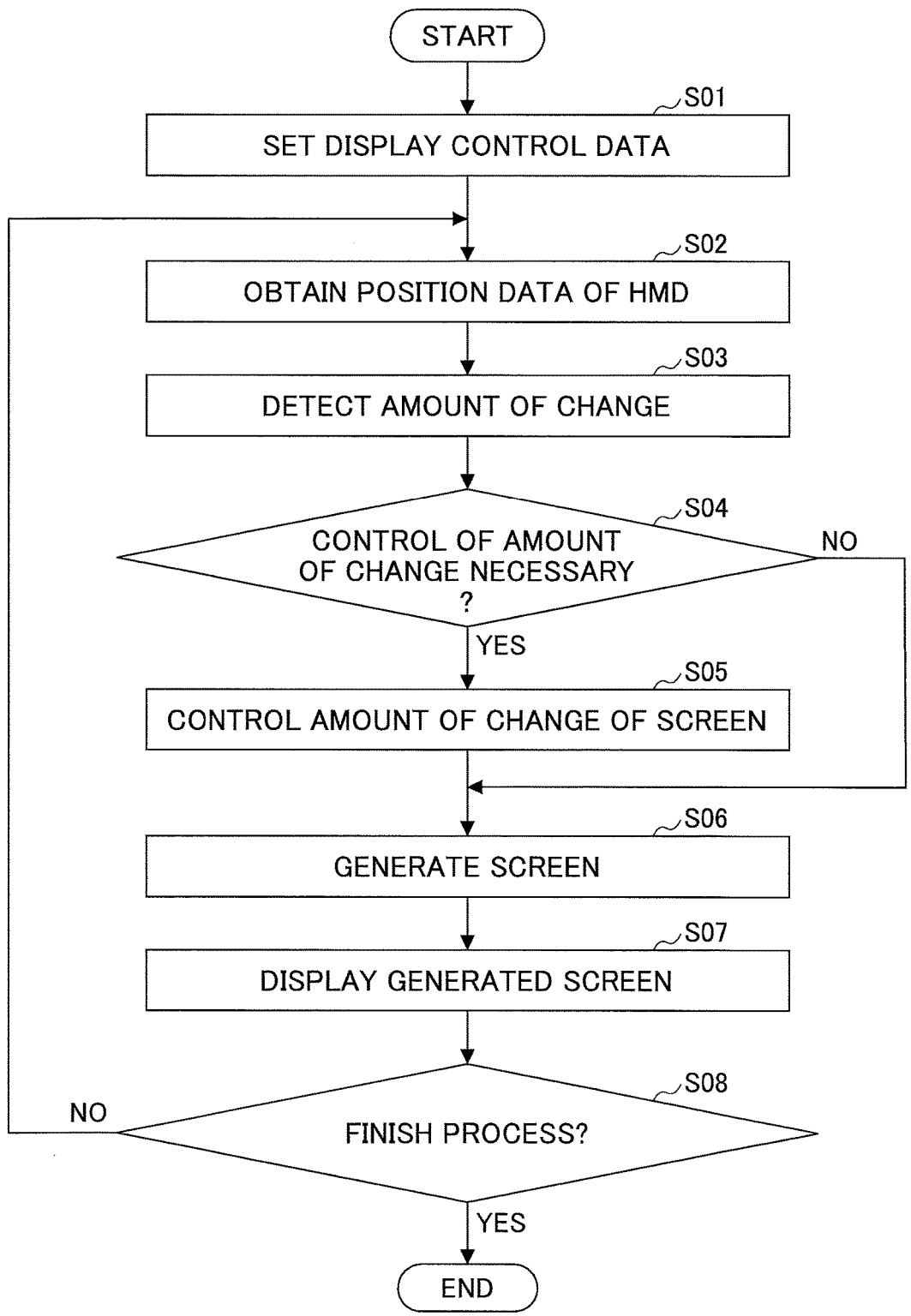
FIG. 4 is a flowchart illustrating a display control process of a first example.

FIG. 4 is a flowchart illustrating the display control process of a first example. In the example of FIG. 4, the display control setting unit 12 of the data processing apparatus 10 sets setting for display control data in order to prevent the visually induced motion sickness of the embodiment (S01). The setting data is input by using the HMD 21, the controller 22 or the like in the process of S01. However, this is not limited so, and the setting data may be input by voice (sound). The set content is stored in the storage unit 13.

Further, the setting data may be input via a config screen or the like before starting a game in the process of S01. However, this is not limited so, and the setting can be dynamically changed by pressing a button that is previously provided in the controller 22 when playing the game, for example.

Next, the data processing apparatus 10 obtains position data from the HMD 21 and instruction data from the controller 22 (S02). The position data is a three dimensional position, and direction in a reality space, for example. The acceleration or the like may be measured from the moving amounts of the position and the direction per time unit, and this data may also be included in the position data in the process of S02. Further, the data processing apparatus 10 obtains a content of an operation instruction from the controller 22 during the game in the process of S02.

Next, the detection unit 14 detects the amount of change of the position or the acceleration of the HMD 22, or the amount of change of the displayed image per time unit. Next, the judging unit 15 judges whether it is necessary to control the amount of change based on the detected amount of change (S04). The judging unit 15 may judge whether it is necessary to control the amount of change by comparing the detected amount of change with the previously set display control pattern and judge whether the detected amount of change matches the control condition stored in the display control pattern in the process of S04. However, the method of judging is not limited so.

When it is necessary to control the amount of change (YES of S04) in the process of S04, the display control unit 16 controls the amount of change of the screen (S05). In the first example, in the process of S05, the display, control unit 16 reduces the velocity of the viewpoint, the fixation point (decreases the upper limit of the velocity), for example. Further, the display control unit 16 limits the change of the velocity of the viewpoint, the fixation point (moderates the change of the velocity), for example. Further, the display control unit 16 reduces the velocity of zooming (zoom in) or zoom out of the image, for example. Further, the display control unit 16 may increase the resolution of the image so that the player does not feel sickness so easily. However, when the resolution is increased, the process road of the hardware increases as well. Thus, the display control unit 16 may cut a part of the image expression in the first example.

Further, the display control unit 16 may cut (scene cut) a scene of a stage in which the movement of the image is large, and automatically proceed the game, for example. Further, the display control unit 16 may cut the vibration in a vertical direction in a scene of a first person viewpoint of walking or riding on a vehicle, for example.

The display control unit 16 may select a display control pattern from among the above described display control patterns in accordance with the previously set condition. In such a case, the display control pattern is stored in the storage unit 13, and the display control unit 16 is capable of performing display control in accordance with the display control pattern by referring to the stored display control pattern. Further, the display control pattern is set by the display control setting unit 12.

After the process of S05, or in the process of S04, when it is unnecessary to change the amount of change (NO of S04), a corresponding screen is generated (S06), and the generated screen is displayed in the HMD 21 (S07).

Then, the control unit 18 determines whether to finish the process (S08), and returns to the process of S02 when it is determined not to finish the process (NO in S08). Further, when finishing the game by the instruction by the user, by the end of the game or the like (YES of S08), the control unit 18 finishes the process.

As described above, as the display control is performed based on the amount of change of the HMD 21 or the image in the first example, the visually induced motion sickness can be appropriately prevented for each of the users.

(Second Example of Display Control Process)

Figure 5:
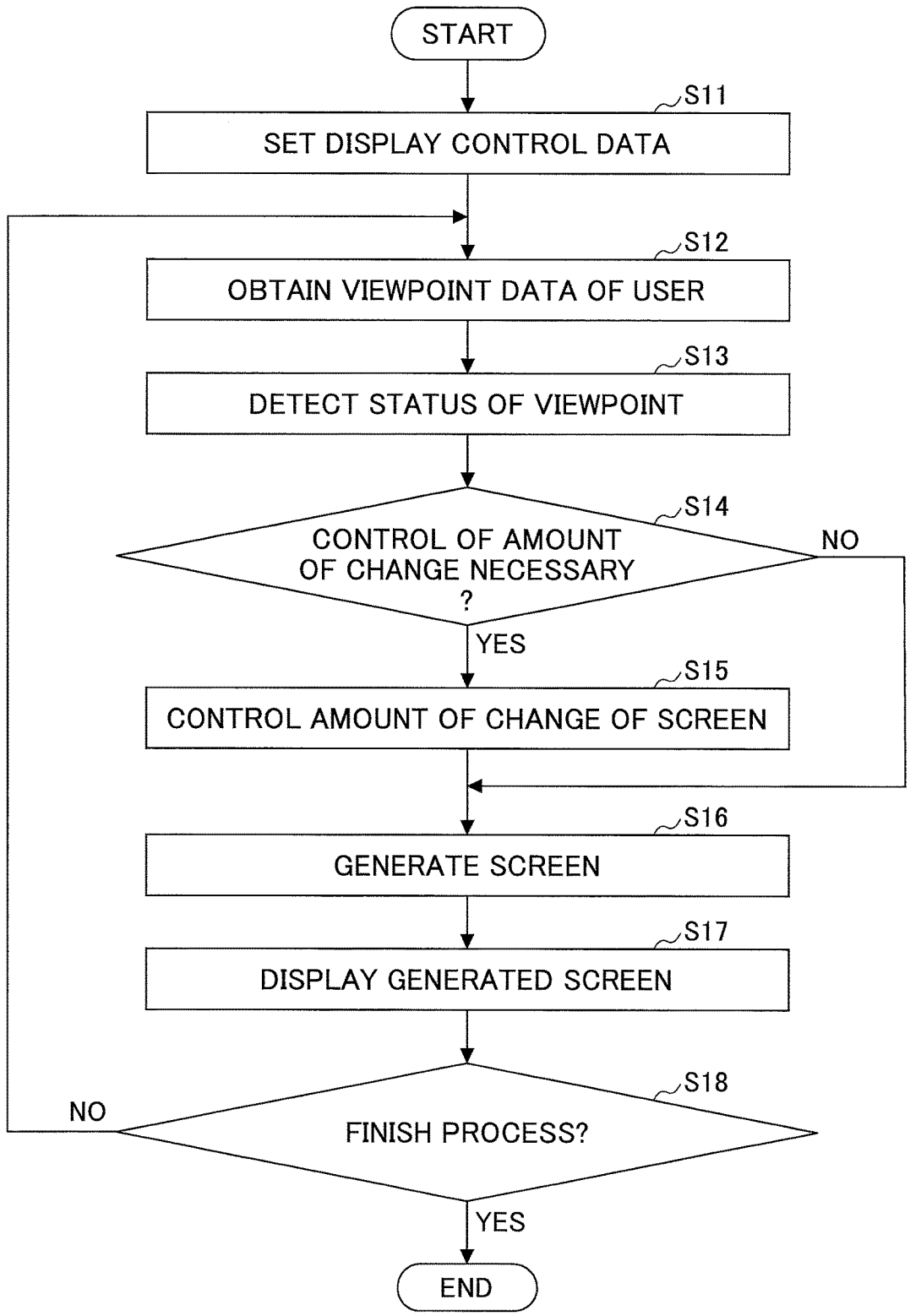
FIG. 5 is a flowchart illustrating a display control process of a second example.

Next, the display control process of a second example is described. FIG. 5 is a flowchart illustrating the display control process of the second example. Whether to perform the screen display control is judged based on the amount of change of the HMD 21 or the image in the above described first example. However, in the second example, viewpoint data of the user is obtained and whether to control the amount of change of the image is judged based on the status of the viewpoint data.

In the example of FIG. 5, the display control setting unit 12 of the data processing apparatus 10 sets display control data in order to prevent the visually induced motion sickness of the embodiment (S11). The process of S11 is the same as the above described process of S01, and the specific description is omitted here.

Next, the data processing apparatus 10 obtains viewpoint data of the user who wears the HMD 21 from the HMD 21 (S12). The detection unit 14 may detect the viewpoint of the user from the position of the irises of the user and the content of the image displayed for the user at the moment in the process of S12. However, the method of detecting is not limited so. Further, the detection unit 14 detects the status of the viewpoint from the position of the viewpoint or the like (S13). The status of the viewpoint is a behavior of the eyes (unfocused, viewpoint is not fixed, period at which the user closes the eyes is long, for example), for example. Further, similar to the first example, when it is possible to obtain the position, the direction, the acceleration or the like of the HMD 21 in the second example, the detection unit 14 may detect the status of the viewpoint from the behavior of the head (unsteady and not stable, for example) or the like.

The detection unit 14 is capable of detecting that the user is suffering from the visually induced motion sickness from such a status. Further, when the HMD 21 can obtain sweat rate, body temperature, heart rate or the like, the detection unit 14 may detect such data or the amount of change of such a data every time unit.

Next, the judging unit 15 judges whether it is necessary to control the amount of change based on the detected result by the detection unit 14 (S14). When it is necessary to control the amount of change (YES of S14), the display control unit 16 controls the amount of change of the screen (S15). The process of S15 is the same as the process of S05, and the specific description is omitted here.

Further, the processes same as those of S06 to S08 are performed in the processes of S16 to S18 in the second example, and the specific description is omitted here.

As described above, as the display control is performed based on the viewpoint position or the like of the user according to the second example, the visually induced motion sickness can be appropriately prevented for each of the users.

(Third Example of Display Control Process)

Figure 6:
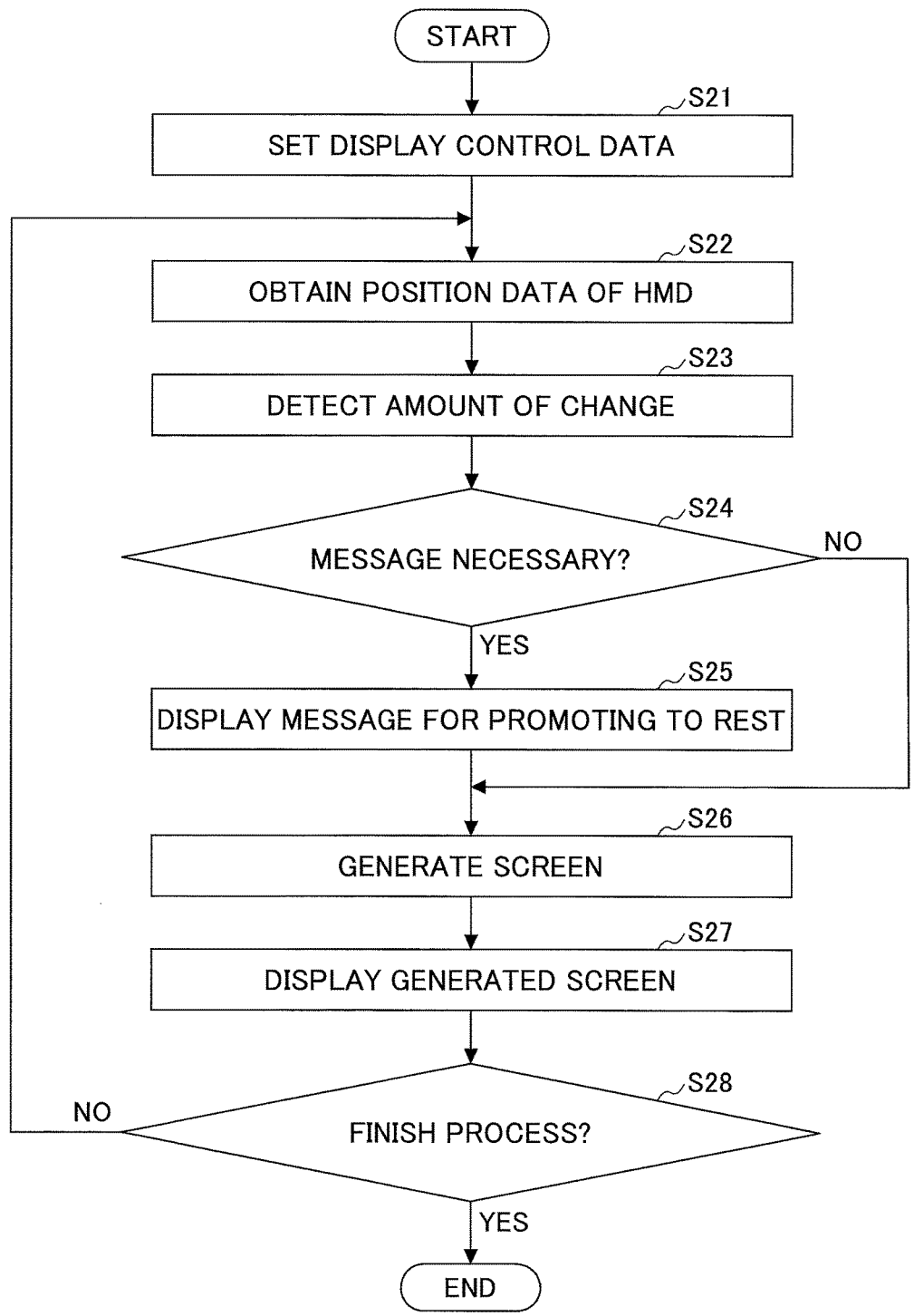
FIG. 6 is a flowchart illustrating a display control process of a third example.

Next, the display control process of a third example is described. FIG. 6 is a flowchart illustrating the display control process of the third example. Whether to perform the screen display control is judged based on the amount of change of the HMD 21 or the image in the first example. However, in the third example, whether to display a message or the like for suppressing the playing of the game is judged, and information including a message, a drawing pattern or the combination thereof promoting to take a rest is displayed in the screen based on the judged result.

The processes of S21 to S23 in FIG. 6 are the same as those of S01 to S03, and the specific description is omitted here. After the detection unit 14 detects the amount of change, the judging unit 15 judges whether it is necessary to display a message based on the detected amount of change (S24). Whether the message is necessary or not may be set by the above described display control pattern or the like, for example, but not limited so.

When it is necessary to display the message (YES of S24) in the process of S24, the display control unit 16 controls the screen generation unit 17 to generate a message or the like for promoting to take a rest to be displayed in the screen of the HMD 21 (S25).

FIG. 7 is a view illustrating an example of displaying a message. The numerals in FIG. 7 correspond to those in FIG. 3. When the amount of change that is greater than or equal to a predetermined value is detected while playing the game in the virtual space 60 displayed in the screen 50 of the HMD 21 in the third example, as illustrated in FIG. 7, a message 70 such as "please take a rest" or the like is displayed in the screen 50. It is preferable that the message 70 is displayed at the forefront center of the screen 50 as illustrated in FIG. 7. However, the position and the size are not limited so. Further, the display control unit 16 may display a predetermined drawing pattern (a warning mark, for example), a message that is a combination of the characters and the drawing pattern or the like instead of the characters as illustrated as the message 70. Further, the display control unit 16 may output a warning sound or the like with displaying the message 70, or outputting a sound message such as "please take a rest" or the like.

Further, after the process of S25 or in the process of S24, when it is unnecessary to display the message (NO of S24), a screen of the game is generated (S26). The processes of S26 to S28 are the same as those of S06 to S08, and the specific description is omitted here.

Although whether the message is necessary or not is judged based on the position data of the HMD 21 and the amount of change of the controller 22, similarly as the first example, this is not limited so. For example, whether the message is necessary or not may be judged based on the viewpoint data or the like of the user, similarly as the second example.

According to the above described third example, by outputting the message for promoting to take a rest when there is some possibility of causing visually induced motion sickness or the visually induced motion sickness is actually occurring, the visually induced motion sickness of the user can be appropriately prevented.

(Example of Display Control Pattern)

Next, an example of the above described display control pattern is described with reference to FIG. 8. FIG. 8 is a view illustrating an example of the display control pattern. In the example of FIG. 8, "condition", "range", "content of control" and the like are included for items of the display control pattern. However, this is not limited so.

The "condition" is an item for control data to be detected for judging whether to perform the display control. The "range" is range of the condition for which the display control is to be performed. The "content of control" is a content of the display control.

For example, when "velocity of viewpoint, fixation point" obtained from the HMD 21 is greater than or equal to the previously set threshold range (A (m/s), for example), scene cut, vibration of upper and lower portions is cut or the like is performed as the content of control. Further, when "amount of change of position of viewpoint, fixation point" obtained from the HMD 21 is greater than or equal to the previously set threshold range (B (m), for example), a warning message is displayed as the content of control.

As such, in this embodiment, one or more contents of display control may be set for each of the conditions. Further, the contents of display control may be set for each of the users.

As described above, according to the embodiment, visually induced motion sickness can be appropriately prevented. For example, in this embodiment, the visually induced motion sickness can be prevented by detecting the amount of change of the HMD 21 or the movement of the displayed image, and controlling the image thereafter when the amount of change exceeds a predetermined amount, (the amount of change of the image is reduced or terminated for a predetermined period, for example). Further, according to the embodiment, the visually induced motion sickness can be improved at an initial stage.

Furthermore, in this embodiment, a behavior of the eye of the user (unfocused or the like), that the user closes his/her eyes by an image in which the movement is fast or the like is detected, and the amount of change (the amount of the movement of the image) is reduced when the behavior or the action satisfies a predetermined condition. Furthermore, in this embodiment, setting of the display control may be set by the user before starting the game or while playing the game.

Although a preferred embodiment of the data processing apparatus and the method of controlling display has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention. Further, a part of or the entirety of the above described first to third examples may be combined.

The above described embodiment may be applied to various games such as a racing game, a shooting game, a fighting game, a flight simulator, a dating simulation game and the like. Further, the image control of the embodiment may be applied to application (program) that does not belong to a category of the game.

What is claimed is:

1. A data processing apparatus that controls a screen displayed by a body-mounted data display device, comprising:
   a judging unit that judges whether to control a velocity of an image displayed in the screen for preventing visually induced motion sickness of a user who wears the body-mounted data display device by comparing data obtained from the body-mounted data display device worn by the user and a previously set display control pattern;

a display control unit that controls the velocity of the image displayed in the screen in accordance with a judged result obtained by the judging unit; and a content generation unit that generates a content to be displayed in the screen based on a content set by the display control unit, and outputs the generated content to the body-mounted data display device.

2. The data processing apparatus according to claim 1, wherein the data obtained from the body-mounted data display device is position data of the body-mounted data display device worn by the user obtained by the body-mounted data display device every time unit, and the judging unit judges whether to control the velocity of the image based on the position data obtained by the body-mounted data display device every time unit.

3. The data processing apparatus according to claim 1, wherein the data obtained from the body-mounted data display device is viewpoint data of the user who wears the body-mounted data display device, and the judging unit judges whether to control the velocity of the image based on the viewpoint data of the user obtained from the body-mounted data display device.

4. The data processing apparatus according to claim 1, wherein the display control unit reduces or terminates the velocity of the image displayed in the screen when the judging unit judges to control the velocity of the image.

5. The data processing apparatus according to claim 1, wherein the judging unit judges whether to display a message when it is necessary to control the velocity of the image, and wherein the display control unit controls to display a predetermined message in the screen in accordance with a judged result.

6. A method of controlling display for a data processing apparatus that controls a screen displayed by a body-mounted data display device,
the method comprising:
judging whether to control a velocity of an image displayed in the screen for preventing visually induced motion sickness of a user who wears the body-mounted data display device by comparing data obtained from the body-mounted data display device worn by the user and a previously set display control pattern;

controlling the velocity of the image displayed in the screen in accordance with a judged result obtained in the judging; and generating a content to be displayed in the screen based on a content set in the controlling, and outputting the generated content to the body-mounted data display device.

7. A non-transitory computer-readable recording medium having recorded thereon a program that causes a computer to execute a method of controlling display for a data processing apparatus that controls a screen displayed by a body-mounted data display device,
the method comprising:
judging whether to control a velocity of an image displayed in the screen for preventing visually induced motion sickness of a user who wears the body-mounted data display device by comparing data obtained from the body-mounted data display device worn by the user and a previously set display control pattern;

controlling the velocity of the image displayed in the screen in accordance with a judged result obtained in the judging; and generating a content to be displayed in the screen based on a content set in the controlling, and outputting the generated content to the body-mounted data display device.

* * * * *